United States Patent [19]
Esterowitz et al.

[11] Patent Number: 5,084,880
[45] Date of Patent: Jan. 28, 1992

[54] ERBIUM-DOPED FLUOROZIRCONATE FIBER LASER PUMPED BY A DIODE LASER SOURCE

[75] Inventors: Leon Esterowitz, Springfield; Roger E. Allen, Alexandria, both of Va.

[73] Assignee: The United States of America as represented by the Sectretary of the Navy, Washington, D.C.

[21] Appl. No.: 546,818

[22] Filed: Jul. 2, 1990

[51] Int. Cl.⁵ .................................. H01S 3/17
[52] U.S. Cl. ............................. 372/6; 372/40; 372/71; 385/141
[58] Field of Search ............ 372/6, 40, 39, 208, 372/75; 350/96.34

[56] References Cited

U.S. PATENT DOCUMENTS

| | | | |
|---|---|---|---|
| 4,788,687 | 11/1988 | Miniscalco et al. | 372/40 |
| 4,955,025 | 9/1990 | Mears et al. | 372/6 |
| 4,962,995 | 10/1990 | Andrews et al. | 372/6 X |
| 4,967,416 | 10/1990 | Esterowitz et al. | 372/6 |

OTHER PUBLICATIONS

G. J. Kintz et al., "CW and Pulsed 2.8 μm Laser Emission...", Appl. Phys. Lett. vol. 50(22), Jun. 1, 1987, pp. 1553-1555.

Primary Examiner—William L. Sikes
Assistant Examiner—Galen J. Hansen
Attorney, Agent, or Firm—Thomas E. McDonnell; George Jameson

[57] ABSTRACT

A room temperature laser system for producing a CW Laser emission at substantially 2.7 microns is disclosed. In a preferred embodiment, the laser system comprises a laser diode source for producing a CW pump beam at a preselected wavelength; and a fiber laser doped with erbium activator ions to produce an output CW laser emission at a wavelength in the range of 2.71-2.78 microns when the fiber laser is pumped by the CW pump beam.

33 Claims, 2 Drawing Sheets

ERBIUM-DOPED FLUOROZIRCONATE FIBER LASER PUMPED BY A DIODE LASER SOURCE

CROSS-REFERENCE TO RELATED APPLICATION

This patent application is related to the co-pending United States patent application entitled "A Thulium-Doped Fluorozirconate Fiber Laser Pumped by a Diode Laser Source", Ser. No. 07/486,638, filed Feb. 28, 1990, both of which applications being commonly assigned to the Government of the United States.

BACKGROUND OF THE INVENTION

1. Field of the Invention

The present invention relates to lasers and particularly to a diode-pumped, fiber laser doped with erbium activator ions for producing an output CW laser emission at a wavelength of substantially 2.7 microns.

2. Description of the Prior Art

In low power applications, such as in telecommunications and in medical and sensing applications, the use of fiber lasers is becoming more and more important.

In a typical fiber laser a rare earth, such as erbium, neodymium, terbium or praseodymium, is doped into the core of an optical fiber to provide an active gain medium for the fiber laser. Typically, the optical fiber is comprised of silica. The input end of the fiber laser is pumped with optical radiation to produce lasing action in the fiber laser at a wavelength essentially determined by the dopant and the mirror reflectivities. The doped optical fiber is included in the laser resonant cavity of the fiber laser.

A major disadvantage of using a silica fiber as the host optical fiber for the dopant rare earth is that a silica fiber is not suitable for transmitting wavelengths longer than 2 microns. The reason for this is that there is too much attenuation of light in the silica fiber at wavelengths above 2 microns.

Intense research and development have been conducted in the area of fluorozirconate (ZrBaLaNa or ZBLAN) glasses to produce ultra-low-loss fibers for optical communications. Minimum transmission losses in ZBLAN fibers occur over the wavelength range between 2 and 3 microns. It is, therefore, highly desirable to develop ZBLAN rare earth fiber lasers in this wavelength range.

A 2.7 micron, erbium-doped multimode fiber laser pumped by a tunable argon laser has been reported by M. C. Brierley et al. in Elect. Letters 24, page 15 (1988). More recently, a 2.71 micron, erbium-doped fluorozirconate single-mode fiber laser pumped by a tunable argon laser at 476.5 and 501.7 nm was reported by J. Y. Allain et al. in Elect. Letters 25(1), page 28 (1989). It was concluded by Brierley et al. and Allain et al., as well as by R. S. Quimby et al. (Applied Optics 28(1), Page 14 (1989)), that excited state absorption (ESA) of the pump beam by the $^4I_{13/2}$ terminal level was the mechanism which allowed population inversion between the $^4I_{11/2}$ and $^4I_{13/2}$. The laser transition is from the $^4I_{11/2}$ level to the $^4I_{13/2}$ level in trivalent erbium ($Er^{3+}$), in which the lower level lifetime (9.4 milliseconds) is longer than the upper level lifetime (7.5 milliseconds)

The argon ion laser is a large and inefficient pump source for practical applications. It would be desirable to use laser diode pumping for a compact and efficient laser system. However, the question arises as to whether some processes such as ESA from the $^4I_{13/2}$ level will be necessary to achieve lasing when pumping around 800 nanometers (nm) using a laser diode pump source. Quimby et al. measured the transition rates involved and concluded that CW lasing would be possible based on favorable branching ratios from the $^4I_{11/2}$ level or manifold, when the $^4I_{11/2}$ manifold is populated by pumping either into the $^4F_{9/2}$ level or $^4I_{9/2}$ level. Quimby et al. also determined that the bright green fluorescence observed when pumping at 800 nm is actually an inefficient upconversion process which should have little or no effect on laser performance in a fiber because of the relatively low erbium concentration used. F. Auzel et al. (in Elect. Letters 24, page 909 (1988)) measured the laser cross-section and quantum yield of the 2.7 micron transition. However, F. Auzel et al. concluded that CW lasing in a fluorozirconate glass host is not likely to occur without some additional means of reducing the lifetime of the $^4I_{13/2}$ terminal laser level.

OBJECTS OF THE INVENTION

Accordingly, one object of the invention is to provide a CW laser around 2.7 microns in an erbium-doped fluorozirconate (ZBLAN) single-mode host fiber, pumped by a CW laser source without any observable excited state absorption of the pump beam.

Another object of the invention is to provide an erbium-doped fluorozirconate fiber laser pumped by a CW laser source.

Another object of the invention is to provide a laser diode-pumped, CW, 2.7 micron, fiber laser and method for operating same.

Another object of the invention is to provide a room-temperature, laser diode-pumped, erbium-doped, fluoride fiber laser for producing a CW laser emission at substantially 2.7 microns.

A further object of the invention is to provide a fiber laser doped with erbium activator ions to produce an output CW laser emission at a wavelength in the range of substantially 2.65 to 2.9 microns when the fiber laser is pumped by a CW pump beam from a laser diode source.

SUMMARY OF THE INVENTION

These and other objects of the invention are achieved by providing a laser system comprising a fiber laser having a length of host fiber doped with erbium activator ions to produce an output CW laser emission at a wavelength in the range of 2.71–2.78 microns when the fiber laser is pumped by a CW pump beam, and a laser pump source for emitting a CW pump beam at a wavelength that will be absorbed by the erbium activator ions in either or both of the $^4I_{15/2}$ to $^4I_{9/2}$ and $^4I_{15/2}$ to $^4I_{11/2}$ absorption bands of the erbium in the fiber laser.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
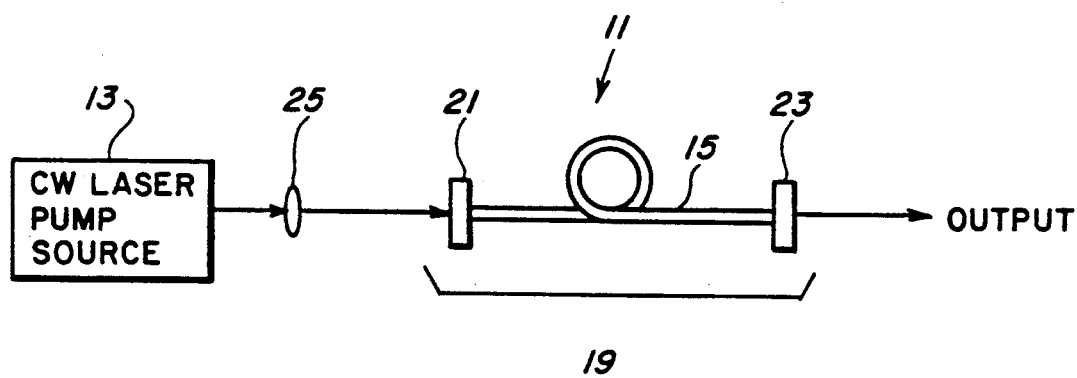
FIG. 1 illustrates a preferred embodiment of the invention.

Referring now to the drawings, FIG. 1 illustrates a preferred embodiment of an erbium-doped, fiber laser 11 pumped by a continuous wave (CW) laser pump source 13 in accordance with the invention. The laser pump source 13 is preferably a laser diode source, but can be a titanium laser or other pump source that can resonantly pump the $^4I_{9/2}$ or $^4I_{11/2}$ levels of the erbium. The fiber laser 11 is comprised of a host optical fiber that is doped with erbium activator or lasant ions (not shown) to form a gain medium fiber or laser fiber 15. The laser fiber 15 is disposed in a linear resonant cavity 19 formed by flat mirrors 21 and 23 which are optically aligned with the laser fiber 15. The laser fiber 15 has an exemplary length of 50 centimeters (cm) and its ends are respectively butt-coupled to the sides of the mirrors 21 and 23 within the cavity 19.

It should be noted at this time that a typical length of this laser fiber 15 would be between 20 cm and 120 cm. However, the length of the fiber 17 can be less than 20 cm. If the length of the fiber 17 is less than 20 cm for the same erbium concentration used in the typical 20 to 120 cm length of fiber 17, the fiber 17 will absorb less of the laser pump power from the laser pump source 13, thus making the laser system of FIG. 1 less efficient. To counteract this loss in absorption, either the pump power of the laser source 13 would have to be increased or the concentration of the erbium in the fiber 17 would have to be increased. In both of these cases this would reduce the laser performance from its optimum value. The length of the fiber 17 could also be much longer than 120 cm. For example, if the quality of the fiber 17 being used were improved such that scattering and other loses were decreased, the length of the fiber 17 could be increased to hundreds of centimeters with good laser performance.

To take advantage of power confinement in the laser fiber 15, a quasi-single mode step index fiber 15 is used with an approximate 7.5 micrometer core radius and an index of refraction between the core (not shown) and cladding (not shown) of about 0.005, giving a cutoff wavelength of about 2.5 microns. The core index of refraction is about 1.5. The nominal diameter of the cladding is about 150 microns.

The laser fiber 15 can be a fluoride fiber, such as a fluorozirconate fiber or a fluorophosphate fiber. For purposes of this description, the laser fiber 15 is preferably a single-mode fluorozirconate glass fiber. This fiber material is well-known in the art. A preferred fluoroziroconate is referred to as ZBLAN, which is an acronym derived from the constituent parts of fluorozirconate, namely, $ZrF_4$, $BaF_2$, $LaF_3$, $AlF_3$ and NaF.

It should be understood that other fluorozirconates can be used in the fabrication of the host optical fiber 15. For example, a fluorozirconate fiber can be fabricated by using constituents selected from the exemplary group consisting of $YF_3$, $LuF_3$, LiF, NaF, KF, $MgF_2$, $SrF_2$, $CaF_2$, $BaF_2$ and $PbF_2$.

A fluorophosphate fiber can be fabricated from the following exemplary typical fluorophosphate compositions of:

| Compound | Mole Weight Percent |
| --- | --- |
| LiF + NaF + KF | 11–16 |
| $CaF_2$ + $MgF_2$ + $BaF_2$ + $SrF_2$ | 45–52 |
| $AlF_3$ $LaF_3$ | 28–34 |
| $P_2O_5$ | 5–8 |

The laser fiber 15 is doped with trivalent erbium activator ions ($Er^{3+}$) having a mole weight percentage in the broad range of 0.01% to 3.0%, a mole weight percentage in the preferred range of 0.1% to 1.0%, or a most preferred mole weight percentage of 0.5% in the laser fiber 15. For a most preferred mole weight percentage of 0.5% of erbium ions in the fiber 15, the constituent ZBLAN parts of $ZrF_4$, $BaF_2$, $LaF_3$, $AlF_3$ and NaF would have the respective exemplary mole weight percentages of 53.8%, 20.0%, 4.04%, 3.16% and 18.87%, and the erbium activator ions would be in the compound $ErF_3$ and would substantially have the mole weight percentage of 0.5% in the host ZBLAN fiber 15.

The laser diode source 13 supplies an exemplary 200 mW, continuous wave (CW), pump beam at an exemplary wavelength of 792 nm to cause the erbium-doped fiber laser 11 to produce a CW laser emission at a wavelength of substantially 2.7 microns. The laser pump source 13 is preferably a GaAlAs laser diode array or a GaAlAs laser diode. Approximately 27 mW of the pump beam is collected and focused by conventional optics 25 onto a spot approximately 8 micrometers by 25 micrometers at the surface of the end of the fiber laser 15 in optical contact with the mirror 21.

The input mirror 21 is transparent to the 792 nm wavelength of this exemplary 27 mW of pump power that is incident thereon, but is almost totally reflective (approximately 99%) to the substantially 2.7 micron, CW laser emission produced by the fiber laser 11 when it is pumped by the pump beam. The output mirror 23 is also highly reflective at 2.7 microns. The reflectance of the output mirror 23 can be between 4% and 98%, but is preferrably between 80% and 98%, and most preferrably is about 98%. However, for purposes of this discussion, the mirror 23 is approximately 20% transmissive at the output wavelength of 2.7 microns. Consequently, mirror 23 also operates as an output coupler to output a portion of the substantially 2.7 micron laser emission developed by the fiber laser 11 when it is pumped by the pump power from the CW laser pump source 13.

As a result of the high transmissivity of the input mirror 21 to the 792 nm wavelength of the diode pump power incident thereon, approximately 85% of the exemplary 27 mW of pump power passes through the mirror 21 and is launched into the input end of the laser fiber 15. Approximately 95% of this launched power is absorbed by the erbium dopant at this low pump power. Upon being longitudinally pumped by this absorbed power, the erbium-doped, ZBLAN fiber laser 11 produces a CW laser emission at substantially 2.7 microns. A portion of this 2.7 CW laser emission passes through the partially transmissive mirror 23 (or output coupler) as the output CW laser emission at a wavelength of substantially 2.7 microns.

In an alternative arrangement, the CW laser pump source 13 can be an InGaAlP laser diode source which lases at a wavelength in the range of 630 nm to 670 nm. A pump beam at a wavelength in this range would still pass through the input mirror 21, be launched into the laser fiber and be absorbed by the erbium-doped laser fiber 15, thereby causing the fiber laser 11 to produce an output CW laser emission at substantially 2.7 microns.

In another alternative arrangement, an InGaAs strained layer laser diode source, which can lase at a wavelength of between 960 nm and 990 nm (but preferrably at a wavelength of about 970 nm), can be employed as the CW laser pump source 13.

Figure 2:
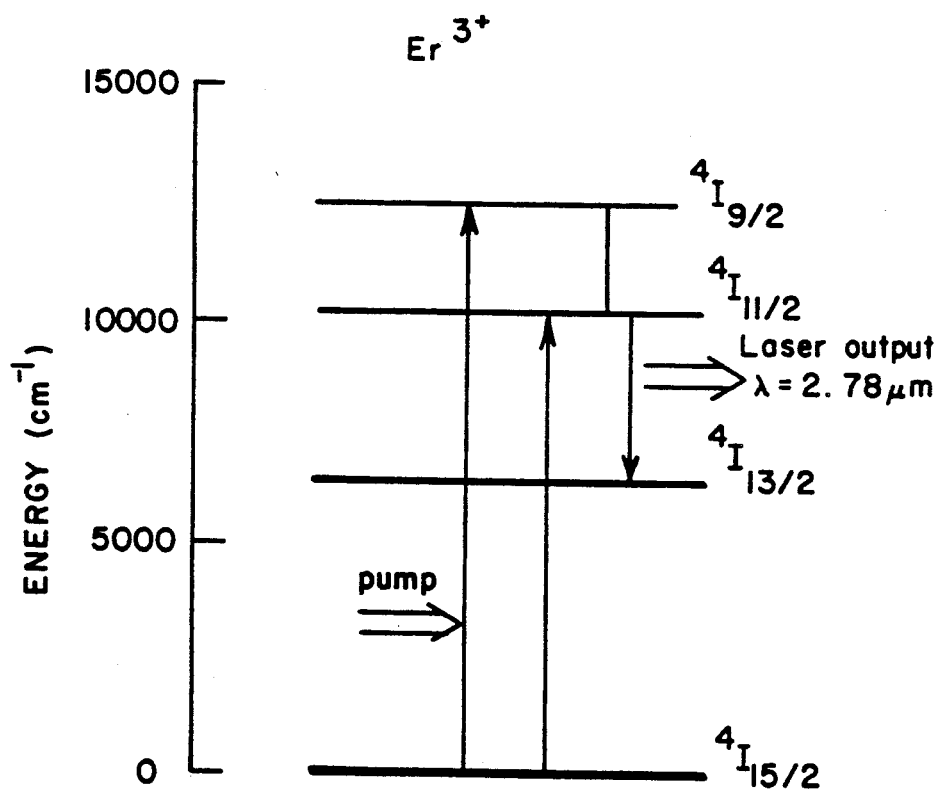
FIG. 2 illustrates an energy level diagram of trivalent erbium, indicating the 2.7 micron lasing transition.

Referring now to FIG. 2, FIG. 2 illustrates an energy level diagram of the trivalent erbium ($Tm^{3+}$) used in the fiber 15, indicating the 2.7 micron lasing transition. As indicated in FIG. 2, in response to the diode pump power at a wavelength of 792 nm (0.792 microns) from the CW laser diode source 13 (FIG. 1), electrons are pumped (or excited) from the $^4I_{15/2}$ ground state level all the way up to the $^4I_{9/2}$ level. The $^4I_{9/2}$ electrons then decay rapidly (in less than 10 microseconds) by multiphonony processes to the $^4I_{11/2}$ energy level. This $^4I_{11/2}$ level is the metastable level and is also the upper laser level lifetime. From the $^4I_{11/2}$ level the electrons drop down to the $^4I_{13/2}$ level, which is the lower laser level. Each electron that drops from the $^4I_{11/2}$ level to the $^4I_{13/2}$ level causes a photon to be emitted by the fiber laser 11 at a wavelength of substantially 2.7 microns. This 2.7 micron wavelength is the wavelength of the output laser emission from the mirror 23.

It should be noted at this time that, as also indicated in FIG. 2, in response to a laser pump power at a wavelength of approximately 970 nm from an InGaAs strained laser diode source 13, electrons would be pumped from the $^4I_{15/2}$ ground state level up to $^4I_{11/2}$ level, which is the upper laser level for 2.7 microns. The laser transition operation from the $^4I_{11/2}$ upper laser level to the $^4I_{13/2}$ lower laser level for a 2.7 micron laser emission is the same as that discussed above.

Each electron that dropped to the $^4I_{13/2}$ level relaxes to the $^4I_{15/2}$ level, depopulating the $^4I_{13/2}$ level and emitting a photon at 1.5 microns in the process. The decay rate of the electrons from the $^4I_{11/2}$ level to the $^4I_{13/2}$ level is 20 sec$^{-1}$+or $-10$ sec$^{-1}$. The decay rate of the electrons from the $^4I_{13/2}$ level to the $^4I_{15/2}$ level is approximately 100 sec$^{-1}$. Since the decay rate of electrons out of the $^4I_{13/2}$ lower laser level to the $^4I_{15/2}$ level is greater than the decay rate of the electrons from the $^4I_{11/2}$ level to the $^4I_{13/2}$, population inversion is achieved. Since the fiber laser 11 is being continuously pumped by the CW pump power from the CW laser diode source 13, the above described operation repeats continuously. As a result, a CW laser emission is developed at substantially 2.7 microns between the $^4I_{11/2}$ and the $^4I_{13/2}$ levels.

It is desirable to minimize excess cavity losses to generate efficient CW laser operation. These losses are primarily contributed by the respective optical contacts between the ends of the fiber 15 and the mirrors 21 and 23, by scattering and by impurity absorption losses. Introducing an index matching fluid (e.g. a paraffin oil) between the ends of the fiber 15 and the associated mirrors 21 and 23 decreases the excess losses in the cavity 19 and significantly aids the successful generation of 2.7 micron laser emissions.

Figure 3:
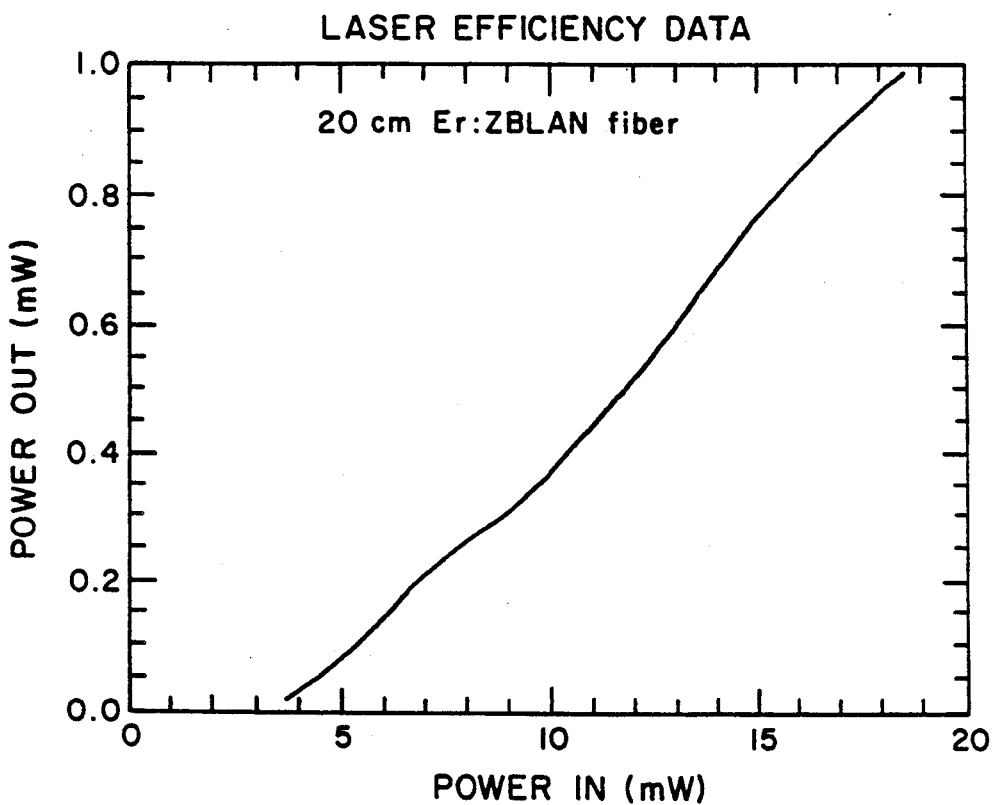
FIG. 3 illustrates laser efficiency data obtained from the system of FIG. 1 at 2.7 microns as a function of pump power launched into the Er-doped, ZBLAN fiber 17 and with a 20% output coupling.

FIG. 3 shows laser efficiency data obtained in the system of FIG. 1 for a 20% output coupling (where output mirror 23 has a 20% transmissivity) and a 20 cm long fiber 15. The 20 cm length of the fiber 15 absorbs just over 50% of the input pump power at the exemplary 792 nm pump wavelength of the CW laser pump source 13. Because of that, the slope efficiency of this data in FIG. 3 is substantially 12% for the absorbed power.

Figure 4:
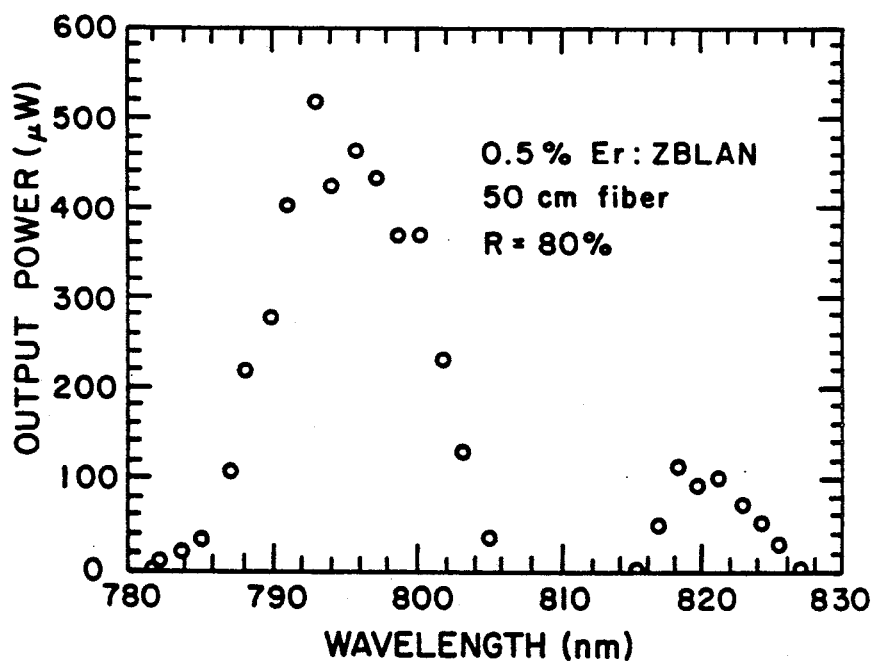
FIG. 4 illustrates the power output of the laser system of FIG. 1 at about 2.7 microns as a function of the wavelength of the pump source.

FIG. 4 illustrates the power output of the laser system of FIG. 1 at substantially 2.7 microns as a function of the wavelength of the pump CW source. Note that, for maximum power out of an exemplary 50 cm-long, 0.5% erbium-doped ZBLAN fiber laser 11 which an output mirror 23 with 80% reflectivity (or 20% transmissivity), the wavelength of the pump source must be substantially 792 nm.

A CW laser pump source 13, such as a laser diode array, can be tuned to substantially 792 nm by controlling the operating temperature of the laser diode source 13 between, for example, 785 nm and 794 nm. Such temperature control can be accomplished by mounting the laser diode source in an enclosure (not shown) and utilizing a conventional temperature control unit (not shown) to control the temperature of the enclosure around room temperature.

It should be noted that CW outputs as high as 1 mW at 2.7 microns have been obtained using a single-mode, erbium-doped ZBLAN fiber laser 11 pumped by a GaAlAs diode source 13. It should also be noted at this time that the system of FIG. 1 can produce an output CW laser emission at a wavelength in the range of 2.65 to 2.9 microns when the fiber laser is pumped by the CW laser pump source 13, because of the different Stark levels (not shown) that are involved in the $Er^{3+}$ energy level diagram of FIG. 2 and because of the slight differences in the previously-described, alternative fiber materials that could be used as the laser fiber 15 in FIG. 1. Finally, it is estimated that the system of FIG. 1 will produce a slope efficiency of approximately 20%.

Therefore, what has been described in a preferred embodiment of the invention is a room-temperature, diode-pumped, fiber laser doped with erbium activator ions for producing an output CW laser emission at a wavelength of substantially 2.7 microns.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A laser system comprising:
  a fiber laser having a length of host fiber doped with erbium activator ions to produce an output CW laser emission at a wavelength in the range of 2.71-2.78 microns when said fiber laser is pumped by a CW pump beam; and
  laser pump means for emitting a CW pump beam at a wavelength that will be absorbed by the erbium activator ions in either or both of the $^4I_{15/2}$–$^4I_{9/2}$ and $^4I_{15/2}$–$^4I_{11/2}$ adsorption bands of the erbium in said fiber laser.

2. The laser system of claim 1 wherein:
  said host fiber comprises a single-mode host fiber having a length between 20 cm and 120 cm.

3. The laser system of claim 1 wherein:
  said fiber laser is selected from the group consisting of fluorozirconate fiber and fluorophosphate fiber.

4. The laser system of claim 1 wherein:
said laser pump means is comprised of an InGaAs laser diode source which lases at a wavelength of about 970 nm.

5. The laser system of claim 1 wherein:
said laser pump means is comprised of an InGaAlP laser diode source which lases at a wavelength in the range of 630 nm–670 nm.

6. The laser system of claim 1 wherein:
said laser pump means is comprised of a GaAlAs laser diode source which lases at a wavelength in the range of 780 nm—830 nm.

7. The laser system of claim 6 wherein:
said GaAlAs laser diode source lases at a wavelength of substantially 792 nm.

8. The laser system of claim 1 wherein:
said laser pump means is comprised of a titanium laser source which lases in the range of 660 nm—1000 nm.

9. The laser system of claim 1 wherein:
said laser pump means is an InGaAlP laser diode array for developing said CW pump beam.

10. The laser system of claim 1 wherein:
said erbium activator ions have a mole percentage in the range of 0.01%–3.0% in the fiber laser.

11. The laser system of claim 1 wherein:
said erbium activator ions have a mole percentage in the range of 0.1%–1.0% in the fiber laser.

12. The laser system of claim 1 wherein:
said erbium activator ions have a mole percentage of substantially 0.5% in the fiber laser.

13. The laser system of claim 1 wherein:
said fiber laser is comprised of a fluorophosphate fiber doped with erbium activator ions.

14. The laser system of claim 1 wherein:
said erbium-doped fiber laser is responsive to said CW pump beam at a wavelength of substantially 792 nm for producing a laser emission corresponding to the $^4I_{15/2}$—$^4I_{13/2}$ laser transition having the wavelength of substantially 2.7 microns.

15. The laser system of claim 1 wherein said fiber laser includes:
a first mirror being highly transmissive to said CW pump beam at said preselected wavelength and being highly reflective to said wavelength of said output CW laser emission;
a second mirror having a lower transmissivity than said first mirror at said wavelength of said output CW laser emission; and
said erbium-doped host fiber having first and second ends respectively butt-coupled to said first and second mirrors;
said erbium-doped fiber laser being responsive to said CW pump beam for producing said output CW laser emission.

16. The laser system of claim 15 wherein:
said first mirror has a high transmissivity to the wavelength of said CW pump beam and a reflectivity of about 98% to a wavelength in the range of 2.71–2.78 microns.

17. The laser system of claim 16 wherein:
said second mirror has a reflectivity of between 4% and 98% to a wavelength in the range of 2.71–2.78 microns.

18. The laser system of claim 16 wherein:
said second mirror has a reflectivity of between 80% and 98% to a wavelength in the range of 2.71–2.78 microns.

19. The laser system of claim 16 wherein:
said second mirror has a reflectivity of substantially 98% to a wavelength in the range of 2.71–2.78 microns.

20. The laser system of claim 15 wherein:
said erbium-doped host fiber has a length of at least 20 cm.

21. The laser system of claim 15 wherein:
said second mirror has a transmissivity of substantially 80%; and
said fiber laser produces an output laser emission at substantially 2.7 microns at a slope efficiency of at least 3%.

22. The laser system of claim 15 further including :
a resonant cavity formed with said erbium-doped host fiber in said cavity and said first and second mirrors disposed at opposite ends of said host fiber to define the limits of said cavity, said resonant cavity having losses of 4% or less.

23. The laser system of claim 1 wherein said laser pump means comprises:
a laser diode array for emitting the CW pump beam at the preselected wavelength; and
optical means responsive to said CW pump beam for directing said CW pump beam into said fiber laser.

24. The laser system of claim 1 wherein:
said laser pump means comprises a single mode diode laser.

25. The laser system of claim 1 wherein:
said fiber laser produces an output laser emission at substantially 2.7 microns at a slope efficiency of approximately 12%.

26. A method for producing an output CW laser radiation at substantially 2.7 microns, said method comprising the steps of:
producing a CW laser radiation in a fiber laser doped with erbium to lase at a wavelength of substantially 2.7 microns; and
continuously pumping the fiber laser with a CW pump radiation to enable the fiber laser to produce the CW laser radiation at substantially 2.7 microns.

27. The method of claim 26 wherein said producing step includes the steps of:
utilizing a fluorozirconate glass fiber in the fiber laser; and
doping the fluorozirconate glass fiber with erbium activator ions to enable the fiber laser to develop a CW radiation at substantially 2.7 microns.

28. The method of claim 27 wherein said continuously pumping step includes the step of:
using a laser diode to continuously pump the erbium-doped fiber laser with a CW pump radiation.

29. A laser system comprising:
a fiber laser including a gain medium fiber doped with erbium to lase at a wavelength of approximately 2.7 microns, and resonant cavity means for forming a resonant cavity with said gain medium fiber in said resonant cavity, said resonant cavity means including an output coupler for outputting CW laser radiation at approximately 2.7 microns; and
means for continuously providing CW pump radiation into said gain medium fiber.

30. The laser system of claim 29 wherein said resonant cavity means further includes:
first and second mirrors disposed at opposite ends of said gain medium fiber, said first mirror having a high transmissivity to said CW pump radiation and a high reflectivity to said CW laser radiation, and said second mirror having a lower transmissivity than said first mirror to said CW laser radiation to form said output coupler.

31. The laser of claim 29 wherein:

said means for continuously providing CW pump radiation is a laser diode source.

32. A method for producing a CW laser radiation at substantially 2.7 microns, said method comprising the steps of:

optically pumping $Er^{3+}$ lasant ions of a gain medium in a fiber laser with the CW pump radiation from a laser diode source;

developing a laser radiation at substantially 2.7 microns from a laser transition of the optically pumped $Er^{3+}$ lasant ions; and producing an output CW laser radiation at substantially 2.7 microns.

33. The method of claim 31 wherein the step of optically pumping the $Er^{3+}$ lasant ions of the gain medium includes the step of:

directing the CW pump radiation from the laser diode source into the gain medium of the fiber laser.

* * * * *